United States Patent [19]
Zhang et al.

[11] Patent Number: 5,659,800
[45] Date of Patent: Aug. 19, 1997

[54] SYSTEM FOR DIRECTLY SENDING UNDECODED RAW SIGNALS FROM READER DEVICE VIA EXTERNAL SLAVE INTERFACE TO PERSONAL COMPUTER THROUGH COMMUNICATION PORT WITHOUT FIRST DECODING THE SIGNALS

[75] Inventors: Huixiang Zhang; Zheng Zhou, both of Brea, Calif.

[73] Assignee: International Technologies & Systems Corporation (ITS), Brea, Calif.

[21] Appl. No.: 132,179

[22] Filed: Oct. 6, 1993

[51] Int. Cl.$^6$ .................................................... G06K 7/10
[52] U.S. Cl. .................. 395/882; 395/828; 395/830; 395/885; 395/856; 395/893
[58] Field of Search .................. 395/275, 828, 395/830, 882, 885, 893, 856; 358/142

[56] References Cited

U.S. PATENT DOCUMENTS

| | | | |
|---|---|---|---|
| 3,585,369 | 6/1971 | Nather | 235/61.11 |
| 4,044,380 | 8/1977 | Justice et al. | 358/142 |
| 4,392,207 | 7/1983 | Dockal | 364/900 |
| 4,538,072 | 8/1985 | Immler et al. | 250/568 |
| 4,672,553 | 6/1987 | Goldberg | 364/478 |
| 4,686,704 | 8/1987 | Kamada et al. | 382/61 |
| 4,855,580 | 8/1989 | Van Maanen, Jr. | 235/440 |
| 4,894,522 | 1/1990 | Elliott | 364/709.1 |
| 5,019,697 | 5/1991 | Postman | 235/441 |
| 5,081,342 | 1/1992 | Knowles et al. | 235/436 |
| 5,144,314 | 9/1992 | Malmberg et al. | 342/44 |
| 5,179,710 | 1/1993 | Coschieri | 395/750 |
| 5,280,336 | 1/1994 | Fantone | 356/124 |
| 5,410,141 | 4/1995 | Koenck et al. | 235/472 |
| 5,561,282 | 10/1996 | Price et al. | 235/380 |

OTHER PUBLICATIONS

"Know–Wedge" specification sheet (2 pages) Jan. 1992.
"The Edge" specification sheet (1 page) Oct. 1992.
"Scan–One" News release, Nov. 17, 1992.
"FlexScan/RS" specification sheet (1 page) (undated).

*Primary Examiner*—Lance Leonard Barry
*Assistant Examiner*—Rehana Perveen Krick
*Attorney, Agent, or Firm*—Millen, White, Zelano, & Branigan, P.C.

[57] ABSTRACT

An automatic identification system includes a reader device, such as a bar code wand, laser bar code reader, CCD, m or combination of reader devices, such as magnetic stripe reader, badge slot reader, or touch memory pen. A slave interface is provided for transferring raw reader signals from the reader device to a communication port of a personal computer. The invention provides a hardware and software system which permits interfacing of multiple reading devices and device types into a single port, and which provides efficient power management.

5 Claims, 9 Drawing Sheets

SYSTEM FOR DIRECTLY SENDING UNDECODED RAW SIGNALS FROM READER DEVICE VIA EXTERNAL SLAVE INTERFACE TO PERSONAL COMPUTER THROUGH COMMUNICATION PORT WITHOUT FIRST DECODING THE SIGNALS

BACKGROUND OF THE INVENTION

1. Field of the Invention

The invention relates to the field of automatic identification, which includes indicia recognition technologies such as bar code, magnetic stripe, touch memory, smart card, Magnectic Ink Character Recognition (MICR) and optical character recognition as some the more prevalent mediums of identification.

2. Related Art

It is known in the art of automatic identification to interface individual ones of various types of reading devices to notebook PC's (Personal Computers) and desktop PC's through the serial port, keyboard port, or game port with hardware decoders transmitting the standard formats to these ports. Examples of the types of reading devices interfaced in this manner include, e.g., bar code laser, CCD, and wand; touch button wand; and magnetic stripe readers.

Most prior art bar code applications and other data collection applications for the IBM PC/XT/AT or compatibles require use of a dedicated hardware device. Such a device normally must have a microprocessor and built-in software which can receive and decode the signals from the mentioned data reading devices and send the decoded data to the PC. Most of these devices povide only one input for the data reading devices in order to lower hardware costs. Further, many of these applications communicate with the PC through the keyboard interface, which requires that the PC keyboard be connected to an external hardware device. This limitation prevents use of such interfaces by most notebook PC's, which do not have keyboard connectors.

Prior art methods and apparatuses for interfacing automatic identification readers to notebook PC's and PC's carry with them several drawbacks and restrictions. First, the serial port is in very high demand for communication purposes by a host of devices, many not even related to automatic identification, such as the mouse. And, many notebook computers contain only a single serial port for interfacing to external serial devices. Second, the prior art devices often require an external decoder box to be attached to the notebook PC and/or PC, which in the case of the notebook PC seriously encumbers its intended portability. Third, different types of reading devices and multiple devices of the same type are often needed to be used on one PC or PC notebook, and such applications are not adequately enabled by the prior art. For example, in point-of-sale applications a magnetic stripe for credit card transactions and one or more bar code readers for checking out products often need to be supported by a single PC. However, the prior art does not provide adequate means for interfacing multiple reading devices to a PC using a single port, i.e., the serial or the parallel port. Fourth, external hardware decoder devices or RS-232 reading devices with built-in decoders, such as CCD or laser scanners, commonly consume more power and often require external power supplies attached to AC outlets, making them immobile. Fifth, when a high-power-consumption reader cannot be substituted by a lower-power-consumption reader, providing that power with the tether to AC outlets hinders portability.

Further disadvantages of prior art automatic identification systems include high hardware costs, low bar code or magnetic decoding speed, limited capability of editing decoded data, and low flexibility of programming the device.

The most common connection provided by the prior art between barcode scanner and computer is the "Wedge" interface. Specifically, two types of Wedge are commonly used: "Keyboard Wedge" and "RS-232 ASCII Wedge". Both types are microprocessor-based bar code decoders which receive "raw" barcode signals from a scanner and output decoded information signals directly readable by a PC. The former type emulates the operation of the keyboard by sending the resulting code to the keyboard port of the computer. And, that type normally requires that the output cable of the Keyboard Wedge be connected to the PC keyboard connector and the PC keyboard be connected to the Wedge. As set forth above, most notebook computers can never be connected to the external Keyboard Wedge. The RS-232 ASCII Wedge-type interface translates the resulting code to ASCII code, which is sent to the computer via RS-232 or RS-422 port. However, the RS-232 ASCII Wedge requires use of communication software on the PC to receive and store the data from the port. As most data processing applications normally receive input throught the PC keyboard, they require use of a special TSR program which can receive the decoded data in ASCII format from the serial port and cause the data to emulate keyboard input.

As notebook PC's become more and more popular in the automatic identification area, the prior art technology is no longer adequate for many data collection applications.

SUMMARY OF THE INVENTION

In one aspect, the invention provides a hardware interface controlled by a software decoder to provide multi-reader, multi-reader-type interface support for the parallel port and/or the serial port of a personal computer. In another aspect, the invention provides a hardware interface controlled by a software decoder to eliminate the necessity for bulky external power supplies for low-power-consumption reading devices such as bar code wands or magnetic stripe readers by sending the PC's high TTL logic level to these devices via the interface as a power source. In another aspect, the invention provides a Windows virtual device driver which permits practice of the invention in the Windows operating system.

In a further aspect, the reader system of the present invention allows for the use of high-power-consumption reading devices such as CCD and laser scanners by utilizing either AC-DC adapters or batteries for the interface and the scanners. In a further aspect, the invention provides an interface which utilizes the parallel port as an alternative input port for automatic-identification data to be received by notebook and other PC's. In a further aspect, the invention provides a software decoder which eliminates the need for hardware decoders attached externally to or installed in PC notebooks or PC's. In a further aspect, the invention provides a hardware and software system which permits interfacing of multiple reading devices and device types into a single port. In a further aspect, the invention provides a reader system which allows for the use of low-cost and low-power-consumption reading devices, such as low-power wands in place of high power and RS-232 wands with built-in decoding software that often require external power supplies. In a further aspect, the reader system of the present invention allows for the use of high-power-consumption reading devices such as CCD and laser readers by controlling and utilizing an integrated power management system.

The present invention provides a hardware and software system which allow raw reader signals to be sent directly from a reader device to the computer, without first decoding those signals, thereby shifting the decoding task to the computer. Because the interface of the present invention does not perform the decoding task, there is no requirement that it incorporate a microprocessor. The structure of the hardware interface between computer port and reader in the present device is thereby less-complicated and less-costly to produce than the "Wedge" interface of the prior art.

Because of this shift of the decoding function, the decoding speed of the present invention is significantly increased over many examples of the prior art. Most Wedge interfaces, for example, use 8-bit or 16-bit single-chip microprocessors which operate at speeds greatly reduced with respect to modern-technology personal computers, many of which perform 32-bit processing at speeds of 50 Megahertz or greater. And, the present system provides greater flexibility in decoding than the prior art.

The interface of the present invention may utilize a printed circuit board which is of such small size that the interface can be incorporated into a special connector which connects at one end to a serial port or a parallel port of a desktop, laptop, or notebook personal computer, and at the other end to one or a plurality of bar code reader devices such as wands, CCDs, laser scanners, badge slot readers, magnetic stripe readers, or touch memory devices. The interface can transfer the signals of these reading devices so as to permit these signals to be received by the hardware devices in a serial port or a parallel port of a PC. And, the software of the present invention processes and decodes these signals, and then sends decoded data to other application software. The software of the present invention can be, e.g., a TSR (Terminate-and-Stay Resident) program for DOS applications, a TSR program in combination with a virtual device driver for Microsoft Windows applications, or a Windows-installable driver for Windows 3.x and Windows NT. Once the software is installed, it can be automatically activated by any event triggered by these data reading devices. Upon activation, it can decode any valid information and send decoded data to any DOS or Windows application which is waiting for keyboard input.

BRIEF DESCRIPTION OF THE DRAWINGS

The foregoing and other objects, features, and advantages of the invention will be apparent from the following more-particular description of preferred embodiments as illustrated in the accompanying drawings in which reference Characters refer to the same parts throughout the various views. The drawings are not necessarily to scale, emphasis instead being placed upon illustrating principles of the invention.

eDETAILED DESCRIPTION OF THE DRAWINGS

Figure 1:
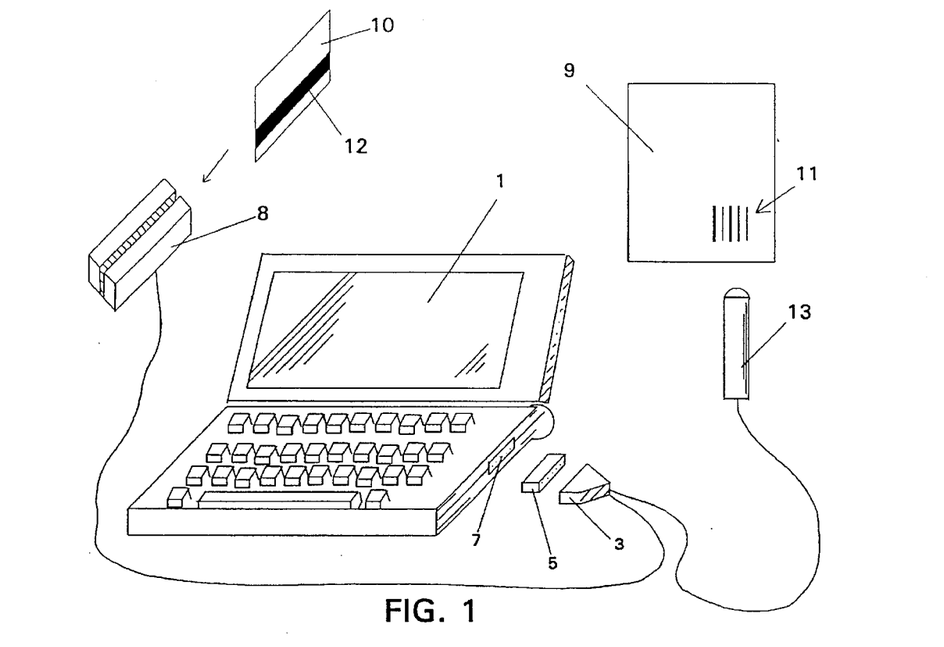
FIG. 1 is a schematic view illustrating primary features of the invention.

Referring to FIG. 1, a personal computer 1 includes an communication port 7 for interfacing to external devices. For purposes of portability, personal computer 1 is preferably a so-called notebook computer. Communication port 7 is a parallel port, serial port, or other similar interface port such as a game port. A very small slave interface 5 is provided between the interface port 7 and connector 3 of a first reader device 13 and a second reader device 8. Reader device 13 is preferably a bar code reader, but could also be a touch memory pen, badge slot reader, magnetic stripe reader, or other reading device. A first indicia 11 on a first item-to-be-identifed 9 is read by reader device 13 in a known manner, such as by passing reader device 13 in proximity of indicial 11. A second indicia 12 on a second item-to-be-identifed 10 is also read in a known manner, such as by passing item 10 through a slot in second reader device 8. Slave interface 5 may be made of such small size that can be integral with connector 3.

Figure 1A:
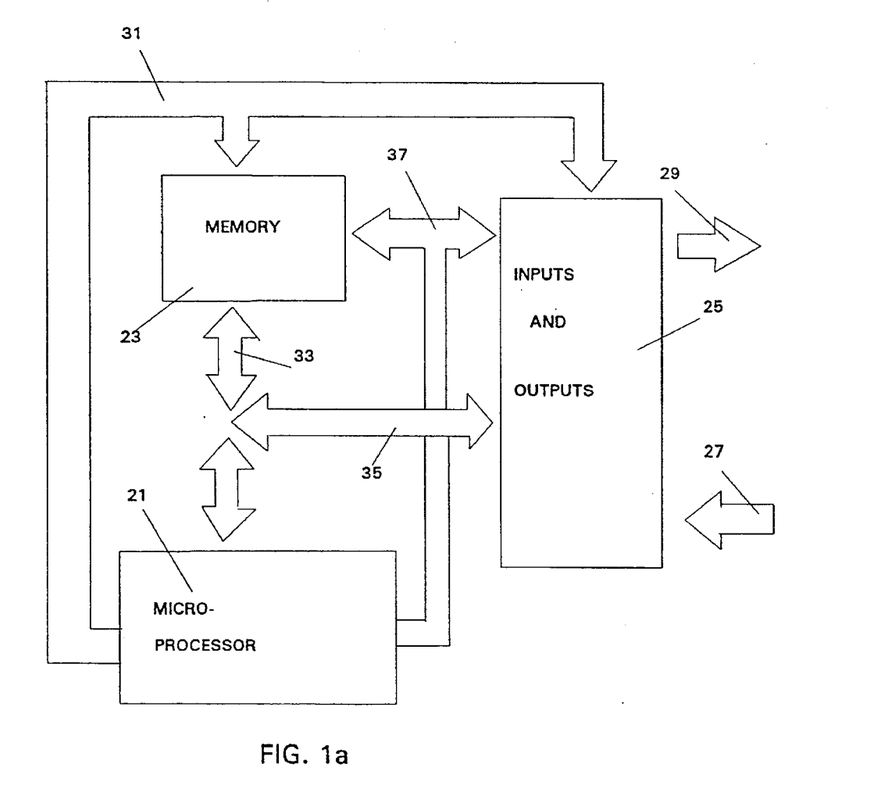
FIG. 1a is a schematic illustration of primary features of a personal computer.

As shown in FIG. 1a, a microprocessor 21 receives input information 27 (such as bar code or other reader signals) from I/O 25 and causes output information 29 (such as display signals) to flow therefrom. Timing and control signals 37 are transferred between I/O 25 and a memory 23. Instruction and data codes 33 flow between memory 23 and microprocessor 21; data codes 35 flow between I/O 25 and memory 23, as well as between I/O 25 and microprocessor 21; address codes 31 from microprocessor 21 flow to memory 23 and I/O 25.

The interface of the present invention receives "raw" reader signals, such as raw barcode signals, from first and second reader devices 13, 8, and sends raw signals to personal computer 1 via interface port 7 without first decoding the signals. The present invention provides a decoding program which, in combination with hardware elements such as a microprocessor within personal computer 1, serves to decode the raw reader signals representing, e.g., identification data encoded in indicia 11 and 12. The raw reader signal is not the common computer "data signal". It has no predefined fixed timing base. However, the timing base is implicit in the raw reader signal.

Preferably, the first phase of the decoding program of the invention is to determine the "implicit timing base". Assuming, for purposes of illustration, that the reader signal is a raw bar code signal, the program measures each pulse duration, bar and spade, of the raw barcode signal to calculate the basic module width of the barcode. Once the basic module width is known, the program can compare the bar widths and space widths of the barcode with the basic module width and can decode the barcode according particular barcode symbology.

In order to perform the above operation, however, the system first transfers the raw data to the personal computer 1 via its interface port 7. The particular manner in which this is accomplished varies depending upon which type of interface port is being utilized.

Figure 2:
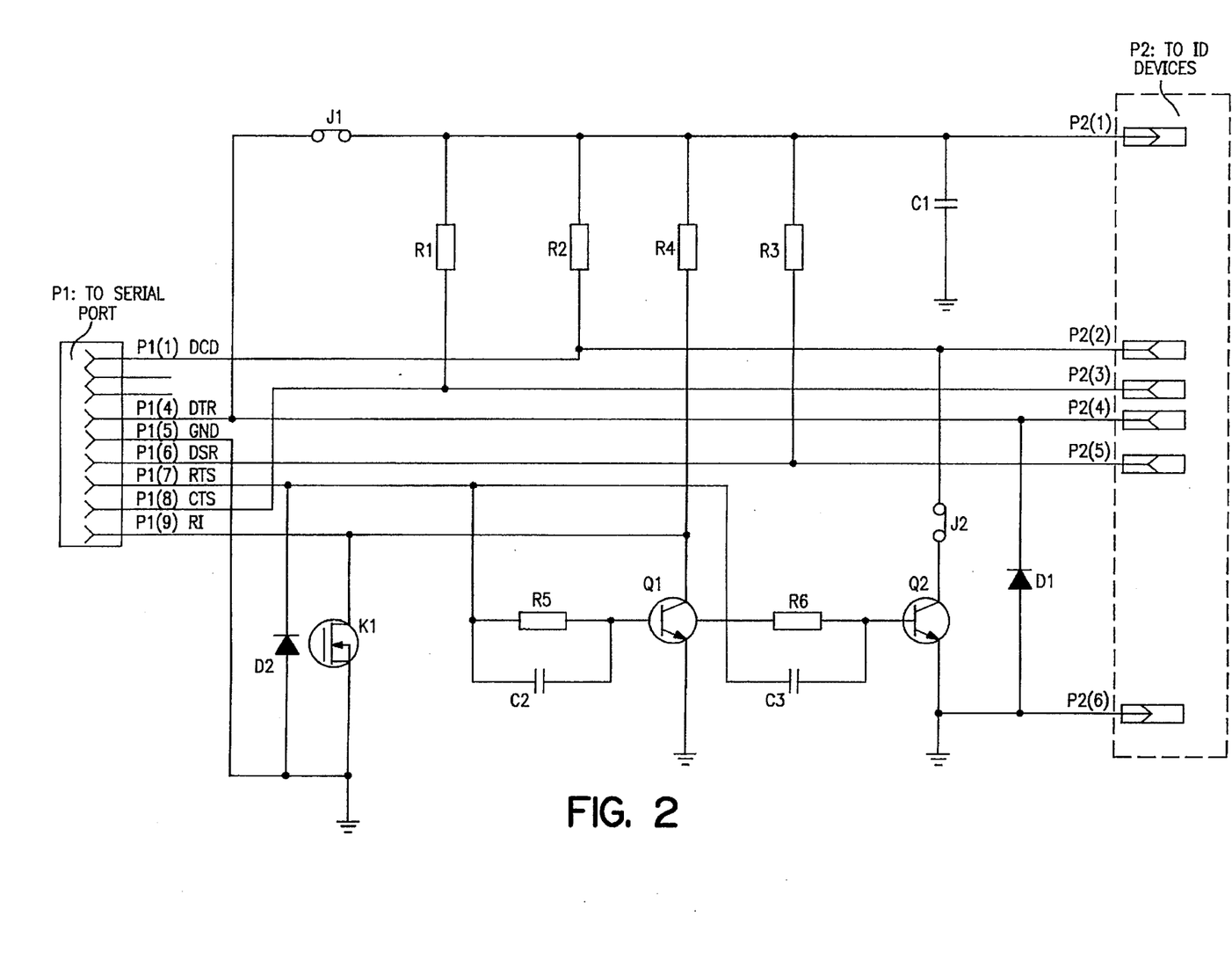
FIG. 2 is a schematic diagram which illustrates electrical details of the slave interface according to a first embodiment of the invention wherein the slave interface is connected with a serial port on the personal computer.
Figure 3:
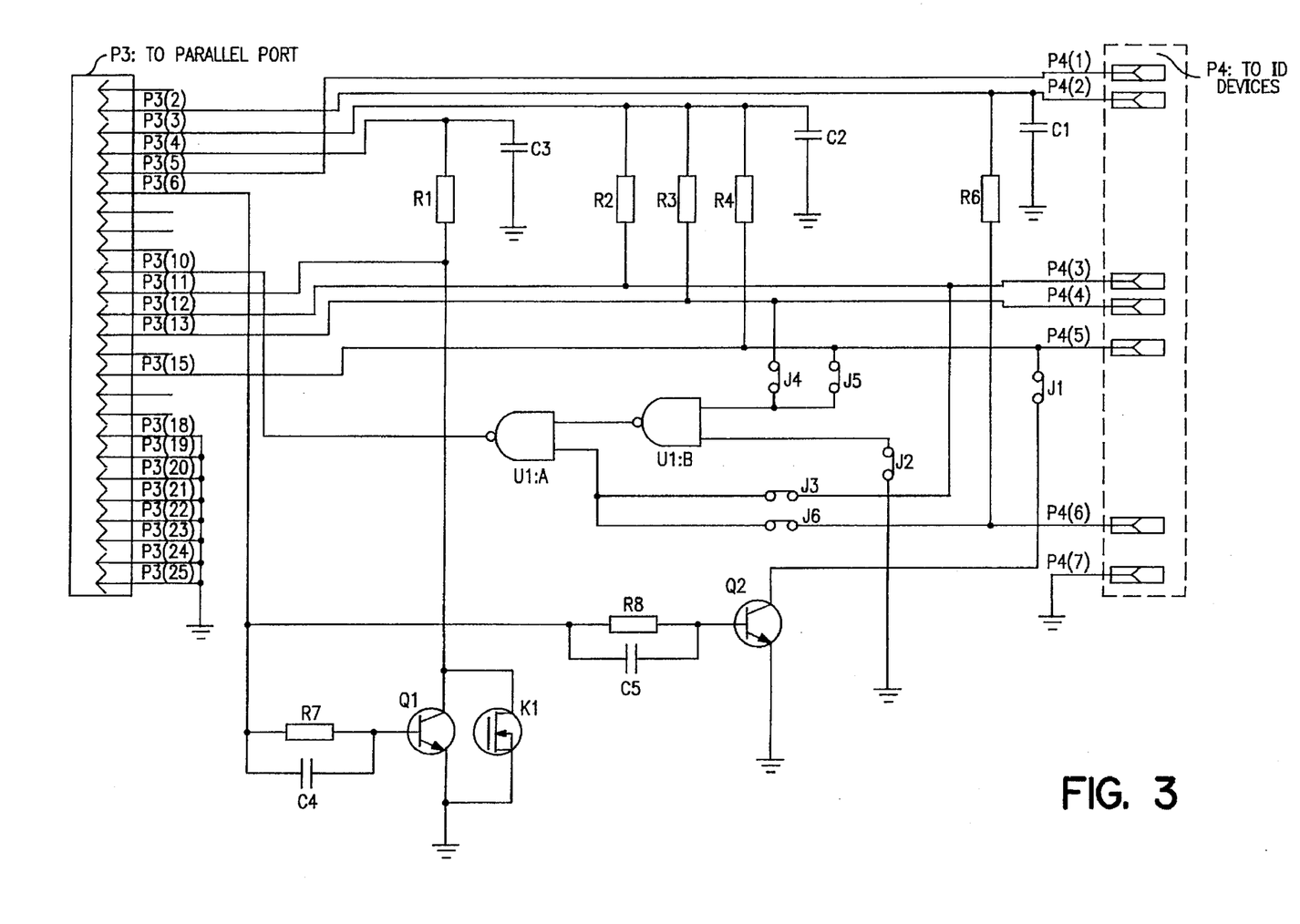
FIG. 3 is a schematic diagram which illustrates electrical details of the slave interface according to a second embodiment of the invention wherein the slave interface is connected with a parallel port on the personal computer.
Figure 4:
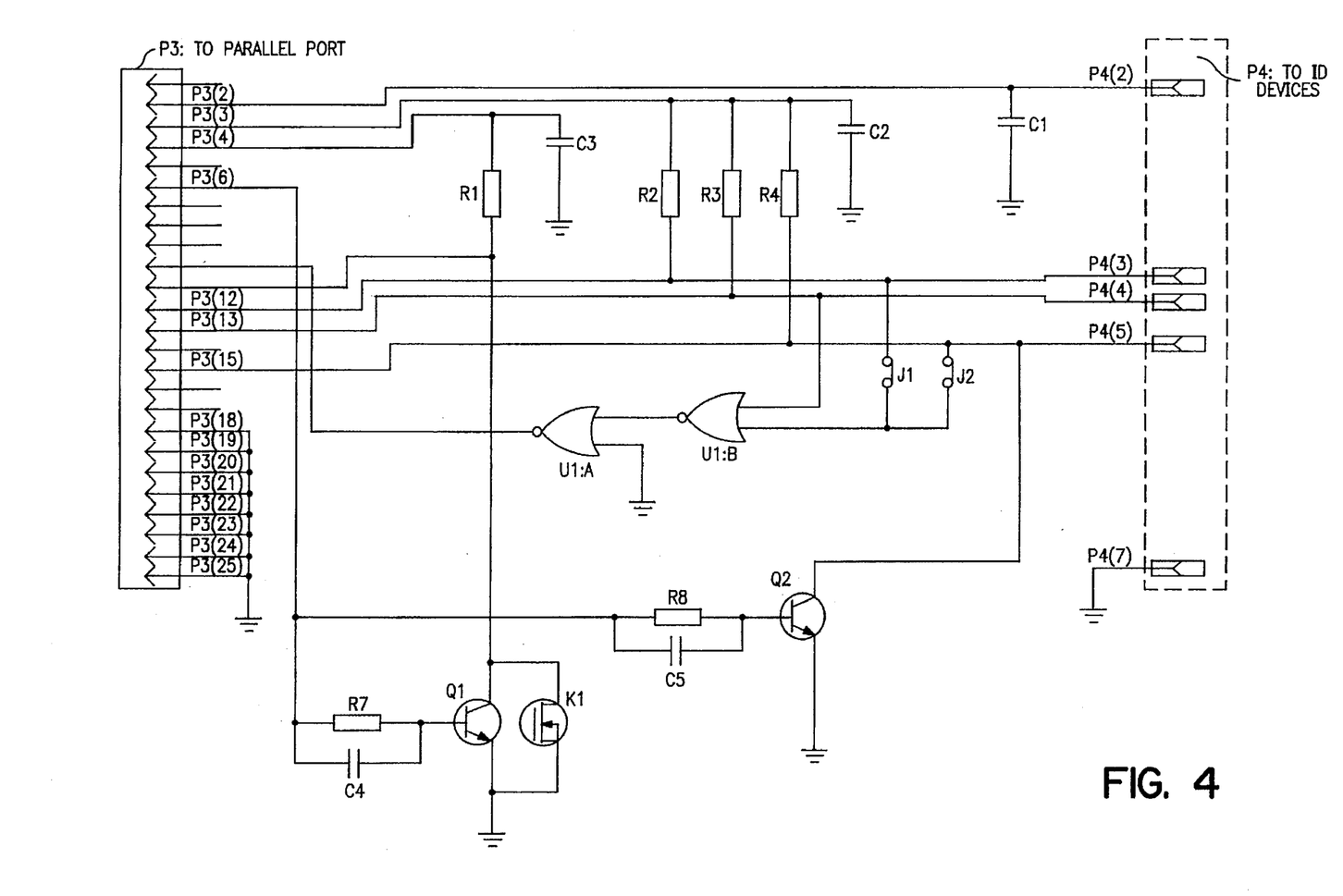
FIG. 4 is a schematic diagram which illustrates electrical details of the slave interface according to a third embodiment of the invention wherein the slave interface is connected with a parallel port on the personal computer.

Turning now to a discussion of FIGS. 2, 3, and 4, those figures illustrate first, second, and third embodiments of the invention, respectively.

FIG. 2 illustrates the slave interface according to a first embodiment of the invention, wherein the serial port of a personal computer is utilized. This embodiment will be described assuming that the raw reader signal is a raw barcode signal, and the personal computer 1 is an IBM-compatible notebook computer. As shown, connector P1 is a DB9F serial connector containing pins P1(1) to P1(9).

There are five input signal lines in a PC serial port. These are, Receive Data (RD), Data Set Ready (DSR), Clear To Send (CTS), Data Carrier Detect (DCD), and Ring Indicator (RI). Among the five input lines, the first line RD is the serial data input line, and the other four lines are MODEM status lines.

The serial data input line is not preferable to serve as the raw barcode signal input line because the line is connected to the shift register in the UART, and therefore the program cannot easily determine the current signal logic level on the line.

The MODEM status lines, however, are connected to the MODEM status register in the UART; each of the lines has a bit in the register. When the signal level on the line is changed, the new status of the line is latched to it's bit promptly. Because a program can access the MODEM status register to read the current signal level on any one among the four lines whenever it is needed, any of the modem status lines can indeed be used as the raw signal input line. Further, a MODEM interrupt will be triggered when any signal level on the four lines is changed.

Assume, e.g., that the CTS line is selected as the raw barcode signal input line. When the scanner starts to scan a barcode, the first change of the signal level on the CTS will cause a MODEM interrupt signal to be generated; this interrupt signal is used by present invention to trigger the decoding program. After it triggered, the decoding program monitors bit "4" of the MODEM status register; whenever the content of bit "4" is changed from "1" to "0" or "0" to "1", the program records the changing time using the system timing clock.

In this way the program can obtain each pulse duration of the bar signal and space signal of the barcode. The procedure continues until a "quiet zone" is detected. The quiet zone is a wide white area which serves as mark that the barcode has terminated. On the signal line it looks like a long duration pulse which is easily distinguished from the other valid bar and space signal pulses. When the quiet zone is detected, it signals that the entire barcode has been scanned, and the program has obtained a whole set of durations of each bar and each space of the barcode. Once such information is obtained, the program can calculate the basic module width of the barcode using this duration information, and then decode the barcode according to particular barcode symbology.

The present invention is useful in connecting at least the following nine scanner types and combinations of scanner types to the personal computer via the serial port slave interface or the parallel port slave interface:

Connecting a WAND type barcode scanner

Connecting a HHLC type barcode scanner

Connecting a MSR

Connecting a Touch Memory (TM)

Connecting two WAND type barcode scanners

Connecting a WAND type barcode scanner and a MSR

Connecting a WAND type barcode scanner and a TM

Connecting a HHLC type barcode scanner and a TM

Connecting a MSR and a TM

The first embodiment of the invention supports all nine applications via the serial port, while the second supports the first, second, third, fourth, sixth, eigth, and ninth applications via the parallel port; the third embodiment supports the fifth and seventh applications via the parallel port.

The physical size of the interface according to the first embodiment can be, for example, on the order of 0.6"×0.6", thereby allowing it to be fitted into a DB9 connecter. Connector P1, containing lines P1(1) to P1(9), connects to the communication port of the personal computer, while connector P2, containing terminals for lines P2(1) to P2(6), connects to the reader device.

Preferably, connector P1 of the serial port is connected to the COM1, COM2, COM3, or COM4 port of the PC or compatible machine. On the PC board of the slave interface, connector P2 is a six-pin "golden fingers" on which the terminals of the connected bar code scanner are soldered directly. The pin-out of connector P2 for the nine applications is as follows:

|  | P2(1) | P2(2) | P2(3) | P2(4) | P2(5) | P2(6) |
|---|---|---|---|---|---|---|
| WAND | VCC |  | W-DA1 |  |  | GND |
| HHLC | VCC | TRIG | H-DA | P-ENA |  | GND |
| MSR | VCC | CLK | CARD |  | M-DA | GND |
| TM |  | T-DA |  |  |  | GND |
| WAND-WAND | VCC |  | W-DA1 |  | W-DA2 | GND |
| WAND-MSR | VCC | CLK | W-DA1 |  | M-DA | GND |
| WAND-TM | VCC | T-DA | W-DA |  |  |  |
| HHLC-TM | VCC | T-DA | H-DA | P-ENA | TRIG | GND |
| MSR-TM | VCC | T-DA | CLK |  | M-DA | GND |

The above abbreviations are defined as follows:

VCC: the Power Supply terminal of the device which is connected to the interface;

GND: the ground terminal of the device which is connected to the interface;

W-DA1, W-DA2: the data terminal of the Wand-type scanner;

TRIG: the trigger terminal of the HHLC-type scanner;

P-ENA: the power-enable terminal of the HHLC-type scanner;

H-DA: the data terminal of the HHLC-type scanner;

CARD: the Card-Loading terminal of the MSR;

CLK: the clock terminal of the MSR;

M-DA: the data terminal of the MSR;

T-DA: the data terminal of the touch memory.

Further, the jumper settings for jumbers J1 and J2 (FIG. 2) are as follows:

| | WAND | HHLC | MSR | TM | W-W | W-MSR | W-TM | H-TM | M-TM |
|---|---|---|---|---|---|---|---|---|---|
| J1 | on | off | on | on | on | on | on | off | on |
| J2 | off | off | off | on | off | off | on | on | on |

The basic circuitry shown in FIG. 2 can be used regardless of which type or types of reading device is interfaced. However, the connection of the pins of P2 to respective terminals on the reader will vary dependent upon which type or types are used, and so various configurations are discussed individually below.

WAND CONFIGURATION

Most Wedge interfaces of the prior art were connected to and received power supply from the Keyboard Port of the computer; that power supply was then used to power both the Keyboard and the WAND.

However, the present embodiment's use of the serial port presents a problem in that there is no power pin in the serial port from which to obtain power supply for the WAND and the slave interface circuit itself. The present invention solves this problem in the following manner.

Since the WAND is a low-power-consumption scanner, the supply current is typically 2.7 ma. As a result, it is possible to "steal" the power supply from the output pin of the serial port.

The following table is an example of results obtained from a test of load performance on the DTR line:

| R(K) | open | 5.6 | 3.0 | 2.2 | 1.0 | .82 | .56 | .43 | .30 |
|---|---|---|---|---|---|---|---|---|---|
| Vout(V) | 11.7 | 10.6 | 9.9 | 9.4 | 6.9 | 6.0 | 4.5 | 3.7 | 2.7 |
| Iout(ma) | 0 | 1.9 | 3.3 | 4.3 | 6.9 | 7.3 | 8.0 | 8.6 | 9.0 |

The minimum supply voltage of the WAND is 4 v. So, 4 v is preferably selected as the power supply voltage.

The DTR line is selected as the "power supply" line in the present embodiment. From the loading performance of the DTR terminal, it is estimated that with 4 v power output the DTR line can provide about 8.3 ma current. Two-wand consumption current is less than 5.4 ma, and thus there is still more than 2.9 ma left for the pull-up resistor to draw at low logic level.

According to the EIA standard, the maximum high-level input current of the RS-232 input line is 0.2 ma. If a 5k pull-up resistor is selected to connect to the input line, it will drop down less than 1 v at high logic level. With the 4 v power supply we still have more than 3 v high logic level at the input line, and this is acceptable to meet the EIA standard. With a 4 v power supply the 5k pull-up resistor will draw about 0.8 ma current at the low logic level from the power supply. Deducting the current of two wands from the working current, the DTR can almost support four 5k pull-up resistors with 4 v power output at low logic level. Since this meets the needs of our circuit, a 5k pull-up resistor is preferably selected.

As set forth above, if the data terminal line of the barcode scanner is connected to the PC RS-232 input line with 5k a pull-up resistor which is connected to a 4 v power supply, the terminal would provide more than 3 v at high logic level, which meets the EIA standard. However, the low logic level provided by the barcode scanner is TTL low logic level; though the maximum low-input logic level of the EIA standard is −3 v for practice in the PC industry, the TTL low logic level is acceptable as the RS-232 input low logic level.

The purpose of the diode D1 is to guarantee that the voltage level at the DTR terminal will not be lower than −0.3 v. Because the maximum output low logic level of EIA standard is −15 v, if the low logic level were taken from the DTR without D1, the −15 v power supply would damage the WAND. However, with D1 present it will be turned on immediately, and the voltage of the DTR will be pulled-up to −0.3 v.

C1 represents a filtering capacitor which is used to reduce the high frequency noise.

HAND HELD LASER COMPATIBLE (HHLC) CONFIGURATION

The HHLC scanner needs much more power supply current than the WAND, and so an external power supply is preferably used.

Besides the method of transfer of the barcode signal, the HHLC differs from the WAND also in that it requires that the interface do some power supply control as well.

There are three signal terminals in the HHLC device. They are TRIG, POWER-ENABLE, and DATA. When the trigger button of the HHLC is pressed by the user, the TRIG terminal of the HHLC goes low to signal the user's action. After the POWER-ENABLE terminal of the HHLC is driven to high logic level, the HHLC turns on it's internal scanning source, LASER beam or CCD device, to start the scanning process and sustain it until the terminal is driven to low logic level. During the scanning period the raw barcode signal is output from the DATA terminal.

The TRIG, and DATA terminals should be connected to the input line of the serial port, and the POWER ENABLE should be connected to the output line of the serial port.

The CTS line is preferably connected to DATA, and DCD to TRIG. There are only two output lines, DTR and RTS, in the serial port. But the RTS is used for a Security Key in the preferred embodiment, and so the only line available for POWER ENABLE is DTR, which is used as power supply in the WAND configuration discussed above. In contrast to the WAND configuration, the circuit in the HHLC configuration gets its power supply from an external power supply if the security key is used. The preferred way to accomplish this is to share an external power supply with HHLC by connecting Vcc terminal of the HHLC to P2(1) and setting J1 to "off".

Most HHLC's use 9 v power supplies. However, it is not necessary that all the pull-up resistors be changed because when using 5k pull-up resistors the input high logic level will be higher than 8 v, which is within the range of the EIA standard. The current drawn by the pull-up resistors at low logic level will be doubled, but this is in the range of output current of the TRIG and DATA terminal of the HHLC.

MAGNETIC STRIPE READER (MSR) CONFIGURATION

The MSR reads the signal from the magnetic track of a Magnetic Card. For each magnetic track, there are normally three terminals in the MSR: CARD-LOADING, CLOCK, and DATA. When the magnetic card is inserted into the slot of the MSR, the CARD-LOADING goes to low logic level to signal the user's action. During the period when the CARD-LOADING is low, every falling edge of the pulse at the CLOCK terminal signals that the next bit of the data appears at the DATA terminal. The CARD-LOADING signal can be used for generating an interrupt which triggers the decoding program of the invention. After the decoding program is activated, it monitors the port pin connected to the CLOCK. Whenever a falling edge is detected, the program reads a bit of data from the port pin connected to DATA. The procedure continues until the CARD-LOADING signal goes high. After all the data bits have been gathered, the program starts the actual decoding process.

In the MSR Configuration, CTS is preferably connected to CARD-LOADING, DCD is connected to CLOCK, and DSR to DATA. Like the WAND, the MSR is a low-power-consumption device. So, in the MSR configuration, the MSR itself preferably obtains its power supply from DTR in the same way as the WAND does in its configuration.

The pull-up resistors in the circuit need not be changed to accomodate the MSR.

WAND PLUS MSR CONFIGURATION

Some applications may need to use a WAND and a MSR simultaneously. The slave interface can support such multi-reader connections.

In this case the WAND can be connected using the one-WAND configuration, and the MSR can be connect using the MSR configuration, except that the CARD-LOADING terminal should not be connected to P2(3) because it may conflict with the DATA terminal of the WAND.

Because no CARD-LOADING signal is fed into the serial port in this configuration, the program logic operates in a different manner: Instead of using CARD-LOADING to trigger the MSR decoding program, the first falling edge of the CLOCK of a MSR signal sequence is used.

Feeding the WAND and MSR working current and drawing current of the four pull-up resistors, the working voltage at the DTR falls to 3.9 v, but there is still 3.2 v high logic level at the DCD, DSR, and CTS. This is caused by the real input current of the PC RS-232 input lines being far less than 0.2 ma.

USE OF SECURITY KEY

For purposes of copyright protection, a security key is used in the circuit. The DS2401 Silicon Serial Number device, available from Dallas Semiconductor, can be used as the security key. This device contains an 8-bit family code, a unique 48-bit serial code, and an 8-bit cyclic-redundancy-check value embedded in the silicon. All communication to and from the DS2401 is accomplished via a single interface lead. The data contained within the DS2401 is accessed through the use of time slots and 1-wire protocol.

In the circuit, the security key circuit consists of a DS2401 security key K1, a 2N3904 transistor Q1, a diode D1, and two resistors R4, R5.

The base of the transistor Q1 is connected to the MODEM control line RTS of the serial port via the base resistor R5. The base receives a timing pulse sequence from RTS.

The interface lead of the security key K1 is connected to the MODEM status line RI of the serial port and to the collector of the transistor Q1 as well. In the write slot, the collector of the transistor Q1 sends a command pulse sequence to the interface lead of the security key K1. In response, the security key K1 sends data out it's interface lead in the read slot, during which time the collector of the transistor Q1 is pulled to the high logic level so that the data pulse sequence which was issued from the security key K1 is transferred to the input line RI without being influenced by Q1.

As with the other pull-up resistors, the collector resistor for Q1 is a 5K resistor. Using a 5K collector resistor the saturated collect current of Q1 is less than 1 ma. In this case, 0.1 ma base current is enough, so the 100K base resistor is suitable. The capacitor C2 is used to reduce the switching delay time to improve switching speed.

Like diode D1, diode D2 is a protection diode to avoid the high reverse voltage applied to the base of the Q1.

TOUCH MEMORY (TM) CONFIGURATIONS

The Touch Memory is another ID device which can be connected to the PC through the slave interface. Its operation is very similar to that of the security key, described above. A primary difference is that the security key is mounted on the interface circuit board, while the TM is connected to the interface by touching it to the TM probe, the DATA terminal of which is connected to the interface.

The circuit for interfacing the TM is similar to the circuit for security key interfacing. The circuit consists of transistor Q2, resistor R6, and capacitor C3. The timing pulse sequence is taken from RTS, which also sends a timing pulse sequence to Q1. In this case there is no concern about conflict because the security key and the TM are not normally in operation at same time. The DATA terminal of the TM probe is connected to the P2(2). When the user touches his TM to the probe, it's serial number will be read and transmitted to the serial port through DCD.

There are three input lines in the serial port, but the TM only uses the DCD line. The remaining lines, DSR and CTS, can be used to connect another device; thus, the interface can support other reading devices in combination with a TM: TM with WAND, TM with HHLC, and TM with MSR. It will be understood by those skilled in the art that other combinations are also possible with minor modifications that do not depart from the spirit and scope of the invention.

In the serial port slave interface configurations other than those which use the TM, the jumper J2 should be open. Otherwise, if the collector of transistor Q2 were at low logic level, it would influence the signal status which is connected to the P2(2).

PARALLEL PORT EMBODIMENTS

Turning now to FIGS. 3 and 4, alternative embodiments of the slave interface are shown wherein the parallel port is used for interfacing with an external reader device, that is, where the connector P3 connects to the parallel port of the personal computer. The slave interface according to these embodiments may also be made quite small, e.g., on the order of 1.4"×0.45", and therefore may be fitted into a standard DB25 connector. The second embodiment of the invention will be described assuming that interface port 7 is a parallel port, the raw reader signal is a raw barcode signal, and the personal computer 1 is an IBM-compatible machine.

There are five input lines among the seventeen signal lines in the parallel port. They are:

Pin 10: Acknowledge
Pin 11: Busy

Pin 12: Paper Out

Pin 13: Select

Pin 15: Error

As with the serial port, the program can access the status register in the parallel port adapter to read the current signal level on the five input lines at any time when it is needed. Among the five lines, the Acknowledge line can trigger a parallel interrupt when the signal level on it is changed. Thus, the present invention may also use the parallel port to transfer the raw barcode signal to the decode program in a similar manner as described above with respect to the serial port.

The connector P4 connections for various reader combinations using the interface of FIG. 3 are as follows:

|  | P4(1) | P4(2) | P4(3) | P4(4) | P4(5) | P4(6) | P4(7) |
|---|---|---|---|---|---|---|---|
| WAND |  | VCC |  | W-DA1 |  |  | GND |
| HHLC | P-ENA | VCC | TRIG | H-DA |  |  | GND |
| MSR |  | VCC | CLK | M-DA |  | CARD | GND |
| TM |  |  |  |  | T-DA |  | GND |
| WAND-MSR |  | VCC | CLK | W-DA1 | M-DA | CARD | GND |
| HHLC-TM | P-ENA | VCC | TRIG | H-DA | T-DA |  | GND |
| MSR-TM |  | VCC | CLK | M-DA | T-DA | CARD | GND |

The jumper settings for jumpers J1–J5 according to the embodiment shown in FIG. 3 are as follows:

|  | J1 | J2 | J3 | J4 | J5 | J6 |
|---|---|---|---|---|---|---|
| WAND | off | off | off | on | off | off |
| HHLC | off | on | on | off | off | off |
| MSR | off | on | off | off | off | on |
| TM | on | off | off | off | on | off |
| WAND-MSR | off | off | off | on | off | on |
| HHLC-TM | on | off | on | off | on | off |
| MSR-TM | on | off | off | off | on | on |

The connector P4 connections for various reader combinations using the interface of FIG. 4 are as follows:

|  | P4(1) | P4(2) | P4(3) | P4(4) | P4(5) | P4(6) | P4(7) |
|---|---|---|---|---|---|---|---|
| WAND-WAND |  | VCC | W-DA2 | W-DA1 |  |  | GND |
| WAND-TM |  | VCC |  | W-DA1 | T-DA |  | GND |

The jumper settings for jumpers J1–J5 according to the embodiment shown in FIG. 4 are as follows:

|  | J1 | J2 |
|---|---|---|
| WAND-WAND | on | off |
| WAND-TM | off | on |

The basic concept of the circuit design for the parallel port slave interface embodiments is similar to that of the serial port slave interface embodiment discussed above.

The following table illustrates the parallel port pin to which each signal type is assigned for the various reader devices:

|  |  | WAND1 | WAND2 | HHLC | MSR | TM |
|---|---|---|---|---|---|---|
| P3(5) | (OUTPUT) |  |  | P-ENA |  |  |
| P3(10) | (INT.) | DATA | DATA | !TRIG | !CARD | DATA |
| P3(12) | (INPUT) |  | DATA | TRIG | CLK |  |
| P3(13) |  | DATA |  | DATA | DATA |  |
| P3(15) |  |  |  |  |  | DATA |

In addition to pins listed in the table, pin P3(6) can be used for security key timing signal output, and Pin P3(11) can be used as security key data signal input for every type of device connection.

As shown in the above table, the parallel port embodiments differ from the serial port embodiments in that every type of device connection preferably has a terminal of the device which is not only connected to an input pin, but also to the P3(10) (Acknowledge) pin as well. This is because in the parallel port, the Acknowledge pin is normally the only pin which can trigger the parallel port interrupt. When the slave interface of the present invention is configured in this manner, every type of device should send a proper signal to the Acknowledge pin to trigger the decoding program.

Based on the above requirements, the circuits shown in FIGS. 3 and 4 are designed to meet all nine different applications. The slave interface shown in FIG. 3 may be used for seven applications, while the slave interface shown in FIG. 4 may be used for two other applications.

The two circuits shown in FIGS. 3 and 4, respectively, could be combined into one circuit which could handle all nine (or more) applications; however, separate circuits (as shown) are preferable in order that each circuit be fitted easily into a DB25 connector.

As with the serial port slave interface circuit shown in FIG. 2, all the pull-up resistors R1 to R4 should be 5K resistors, which draw less than 1 ma current at low logic level.

In the embodiments of FIGS. 3 and 4, the power supply can be taken from the DATA OUT Pins 2, 3, and 4, which are connected to a 74LS374 device in the parallel port adapter. The high-level output current of the 74LS374 is 6.5 ma. The following table shows the results of a test of the high-level output performance of the 74LS374:

| R (ohm) | — | 820 | 680 | 560 | 430 | 300 | 200 | 100 |
|---|---|---|---|---|---|---|---|---|
| Vout (v) | 5.0 | 4.8 | 4.8 | 4.8 | 4.7 | 4.5 | 4.3 | 3.7 |
| Iout (ma) | — | 5.8 | 7.0 | 8.5 | 10.8 | 15.1 | 21.5 | 37.0 |

From the table it can be seen that every DATA OUT pin can provide 15 ma current with 4.5 v output voltage.

In the circuits of FIGS. 3 and 4, P3(4) is assigned to load a pull-up resistor and the working current for IC U1 (shown in FIGS. 3 and 4 in two parts as U1:A and U1:B). U1 is preferably a 74HC02 Quad Nor Gate. P3(3) is assigned to load four pull-up resistors, and P3(2) is assigned to load the device working current.

Turning now to a description of the software functions of the present system, a TSR program which implements these functions is described below with reference to FIGS. 5, 6, 7, 8, and 9; however, it will be understood by those skilled in the art that other implementations are possible without departing from the spirit and scope of the invention.

Figure 5:
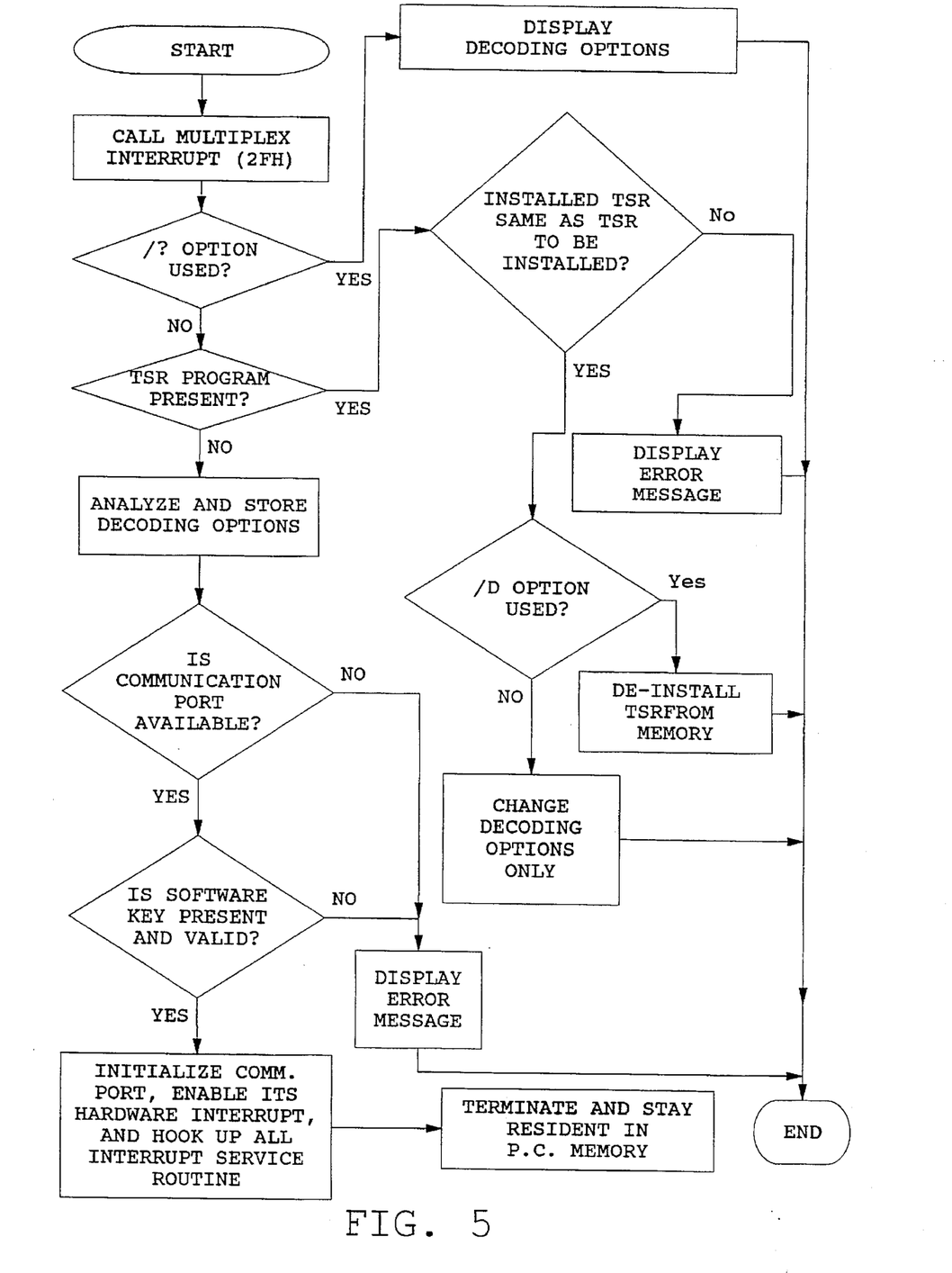
FIG. 5 is a flow diagram showing the logical flow of the TSR software upon execution.

As shown in the flow chart of FIG. 5, when the TSR program is executed, it performs the following steps:

First, it checks for the existence of the decoding program:

a) if it has not been installed yet, the program goes to the second step;

b) if it has been installed already and it is the same program as the one which is being installed, and if the option is /D, the TSR program deinstalls the installed program c) if it has been installed already and it is the same program as the one which is being installed, then new options are received and the old options for the installed program are replaced, then installation ends;

d) if a decoding program has been installed already but it is not the one being installed, the program aborts and shows an error message;

e) if the /? command-line option is used, the TSR program displays the decoding options and ends.

Second, the TSR program analyzes and stores the decoding and installation options specified during installation.

Third, the TSR program checks the availability of the communication port specified during installation; if there is a port failure, the TSR shows an error message and aborts.

Fourth, the TSR checks the security key on the interface board in the port;

Fifth, the TSR initializes the port if the security key exists and is valid—otherwise, the program aborts and shows an error message;

Sixth, the TSR terminates and stays resident in the PC memory.

FIGS. 6–9 show the flow of several routines of the TSR which are triggered by various interrupt signals or are called by DOS software interrupt. These routines serve to decode and transmit identification information to any DOS application.

Figure 6:
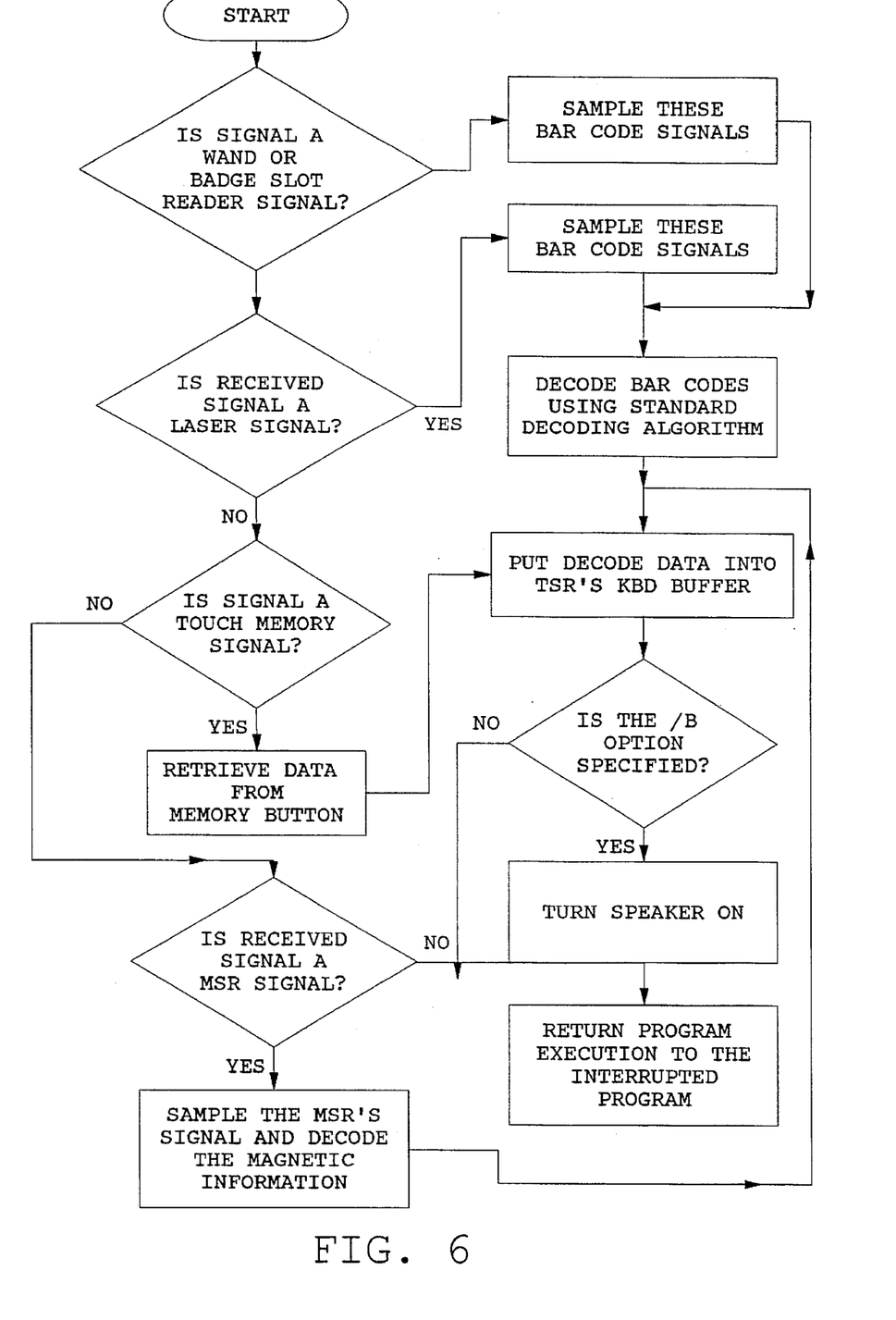
FIG. 6 is a flow diagram showing the logical flow of the TSR software's communication interrupt handler routine.

FIG. 6 shows the logical flow of the TSR software's communication interrupt handler routine, which is triggered by the signal from a reading device. A series of determinations is made therein to establish which type of signal is being received at the communications port, i.e., whether the signal is from a wand, badge slot, laser, touch memory, etc. The communication interrupt handler routine is used in order for the software to catch any signal at any time which is sent from a data reading device to a communication port. To permit this function to operate, the hardware interrupt on the serial port or the parallel port to which the reading device is connected should not be disabled. Further, the interrupt request (IRQ) number for the port should be standard, or it can be specified by the user of the software during installation. The software sets the interrupt flag of the Programmable Interrupt Controller (PIC) for the port according to that number.

Figure 9:
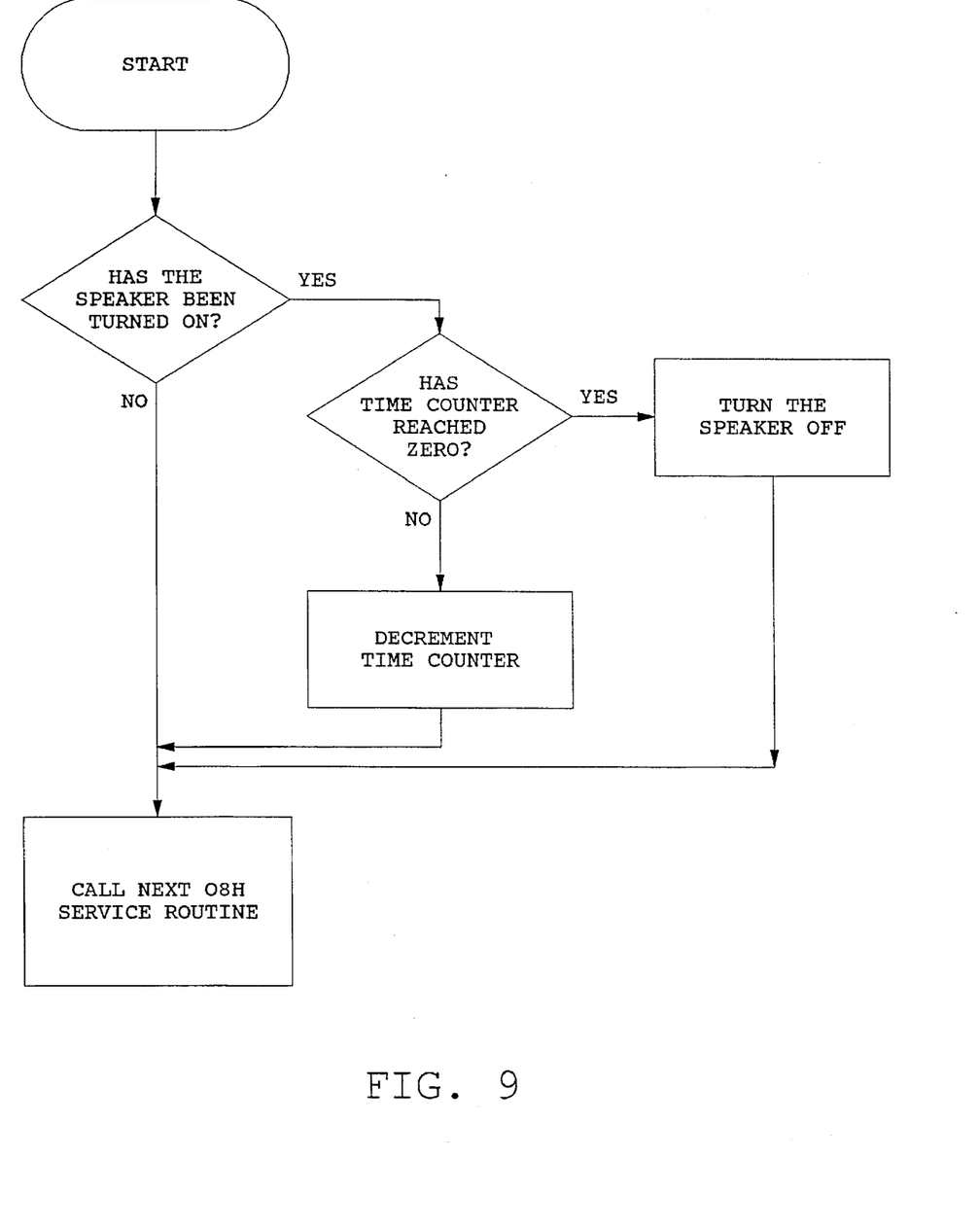
FIG. 9 is a flow diagram showing the logical flow of the TSR software's PC timer interrupt 08h handler routine.

As further shown in FIG. 6, the performance of several steps depends upon whether the PC speaker has been turned on by the TSR program. PC's normally issue a hardware interrupt generated by the timer controller 8254/8253 about every 55 ms. A timer interrupt 08h handler, whose logic is shown at FIG. 9, is used in the software to capture that interrupt and to control the duration of the "beep" for the valid data decoding. The timer interrupt handler accomplishes at least two tasks. First, it checks whether the PC's speaker is turned on by the software and checks the remaining time by examining the value of a time duration variable. Second, it turns the speaker off when that variable decrements to zero.

As further shown in FIG. 6, several steps require sampling of input signals (bar code signals, touch memory signals, Magnetic Stripe Reader (MSR) signals, etc.). All the input signals are preferably sampled at very high frequency and converted to numbers in time duration by utilizing the third counter (at address 42h) in a PC's timer controller 8254/8253. This counter decrements in approximately 838 ns each time. The maximum counter number is normally 65536 and the time for one loop of that counting is about 55 ms. The software uses that counter and checks the overflow to void sampling errors.

Figure 7:
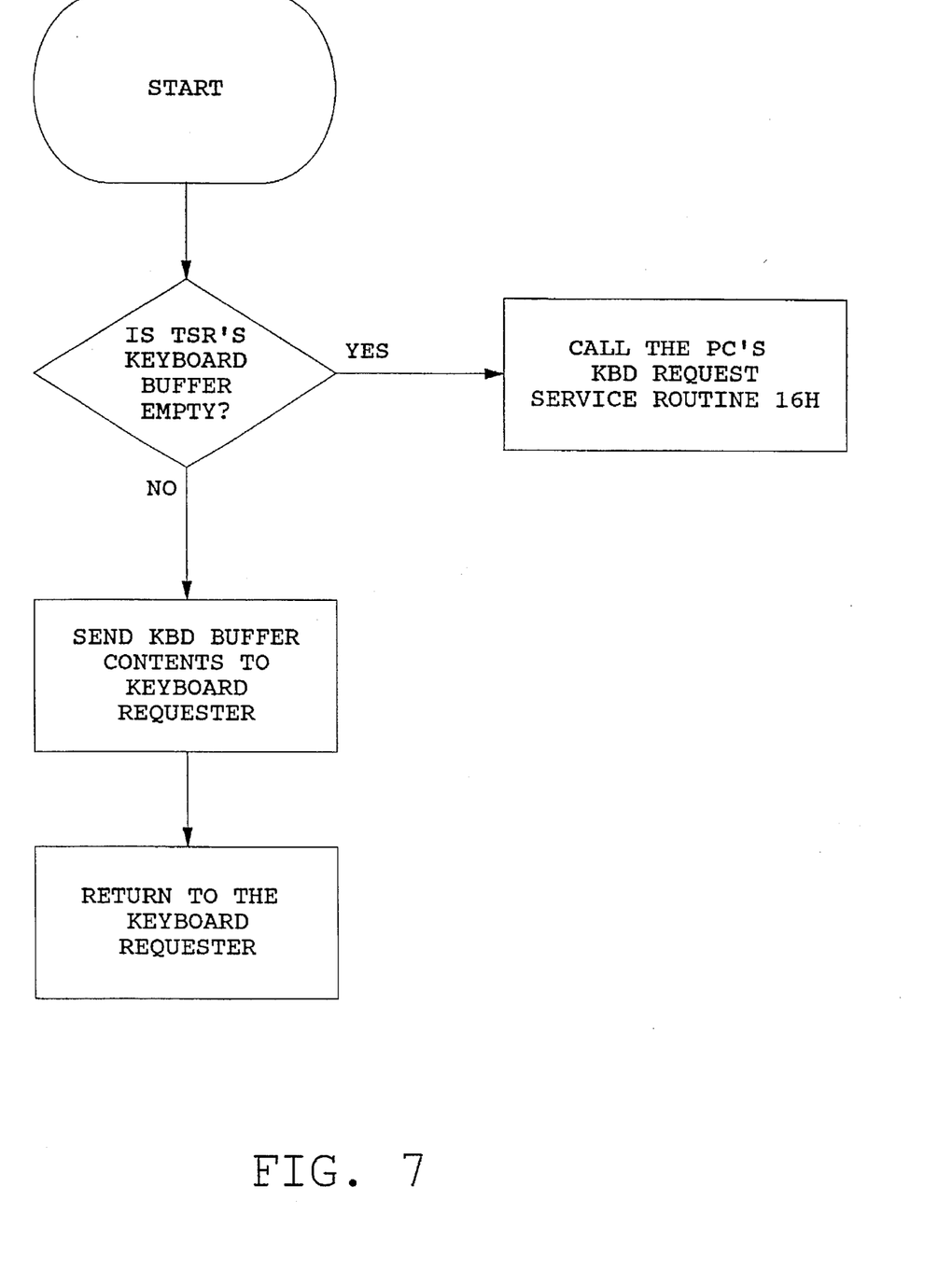
FIG. 7 is a flow diagram showing the logical flow of the TSR software's keyboard request interrupt 16h handler routine.

FIG. 7 is a flow diagram showing the logical flow of the TSR software's keyboard request 16h handler routine. As reflected in FIG. 7, the TSR maintains and periodically checks its own internal keyboard buffer. The software can intercept any keyboard request interrupt (16h) by hooking up a new keyboard request routine. When valid signals are decoded, the buffer is filled. Any DOS or Windows application can then receive this data from the buffer through the call of the keyboard request routine. The buffer is managed in a similar manner as the PC's own keyboard buffer.

Figure 8:
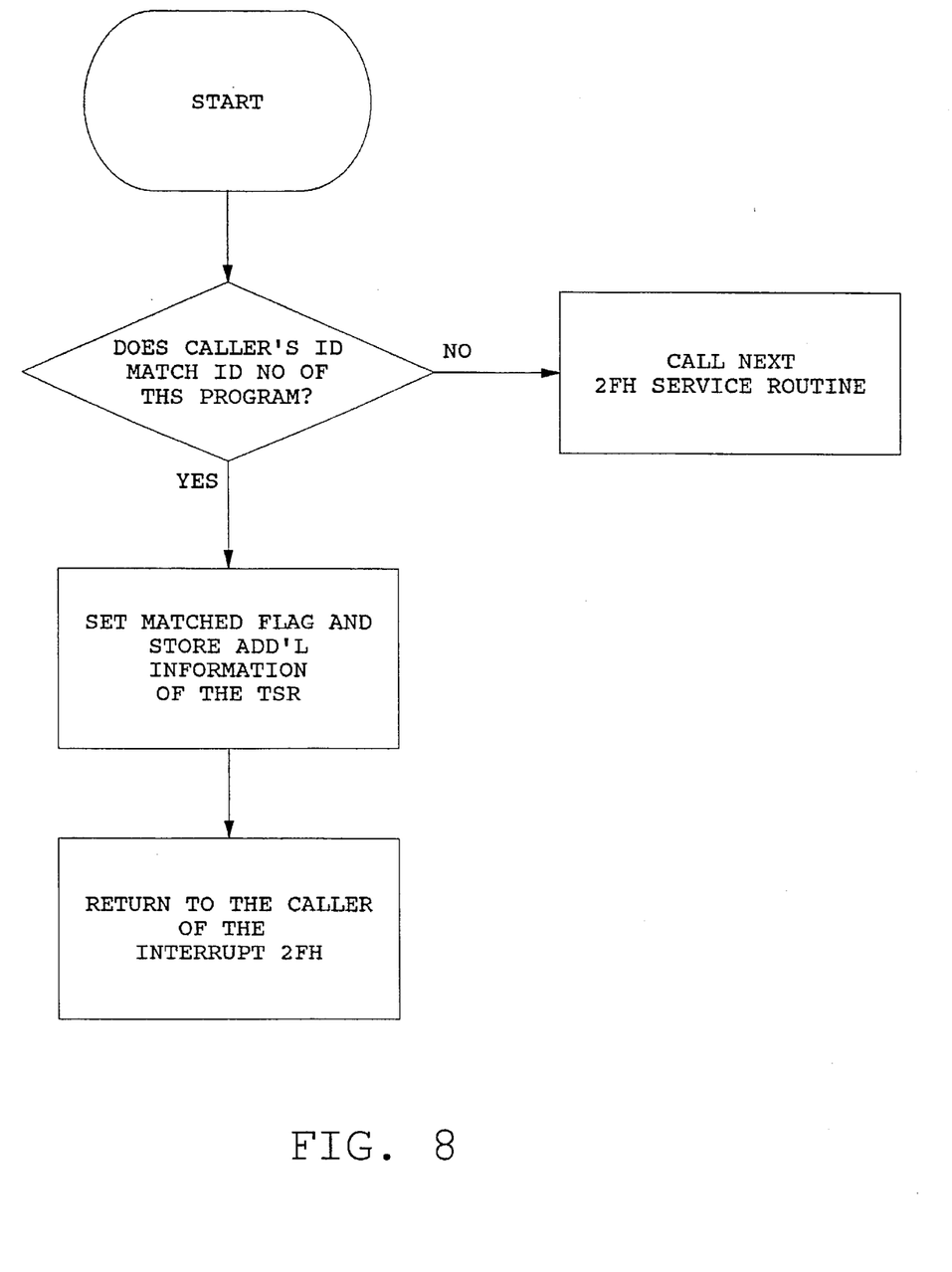
FIG. 8 is a flow diagram showing the logical flow of the TSR software's multiplex interrupt 2Fh handler routine.

FIG. 8 is a flow diagram showing the logical flow of the TSR software's multiplex interrupt 2Fh handler routine. This routine is used to check the presence of TSR programs in PC's memory. The TSR program communicates through the multiplex interrupt (2Fh) function call. Each TSR program can obtain an identification number from 192 to 255 for itself by calling the multiplex interrupt. Each TSR program can obtain additional information associated with the identification number, and So the TSR program can determine the existence of any one of the TSR decoding programs.

The present invention utilizes a unique method of directly accessing a communication port. Conventional DOS programs access a PC serial or parallel port to receive or send data or signals through the function Calls of PC BIOS (Basic Input/Output System) at low level (in assembly language) at final stage. Thus, it is not readily possible for these programs to timely and correctly receive (or send) TTL signals directly from (or to) the serial or parallel port. In the TSR program or installable driver, the serial or parallel port is accessed directly without the function calls of the PC BIOS.

In order to access to the serial or parallel port directly, the software should perform at least three functions. First, it should have the information of the serial or parallel port such as the physical addresses of the port and its receive, send, or status registers. Second, it should enable the hardware interrupt of the port such that the software can be activated at the first occurrence of the signal on the serial or parallel port. Third, it should have the pin definition on the connector of the serial or parallel port and the relation between the pin out and the registers.

The communication port number should be specified when the software is installed; otherwise, a default number is used. The software can find the physical address of the port in the PC BIOS data area (0040:0000–0040:000F) according to that number, and can also check the physical presence of the port. The addresses of all registers can also be located thereafter.

Whenever a signal arrives at the port, the software should be activated to receive and analyze the incoming signals. This can be done by enabling the hardware interrupt of the port and by establishing a service routine for that interrupt event.

The software receives and sends signals over the port by retrieving or storing the binary data over the corresponding registers. By this method, the software can signal these devices whenever necessary, and can receive and decode all the incoming signals.

A special virtual device driver is useful for practicing the invention in the Windows environment. When the Windows operating system is entered, the driver is loaded and performs the initialization and connection with the TSR program. All the options specified during installation remain intact. Afterwards, the driver is called in the Windows operating environment whenever the valid data, which is decoded and transmitted by the TSR program, is ready. The driver emulates the decoded data as the keyboard input characters such that the Windows application can receive the data.

Another version of the software is provided in the form of a Windows-installable driver for Windows NT or Windows 3.x. The driver is installed and configured under the Windows operating environment. It does not need the TSR program and the virtual device driver. Except for minor differences on the interface, installation, and communication in Windows, all techniques used in this software solution are the same.

The Windows-installable driver can perform the following functions when installed the first time. First, it provides a setup file so that the driver's files can be loaded into the Windows directory and so that the driver can be easily installed into memory using the Windows Control Panel. Second, it provides a Windows dialog box for users to specify the decoding options for the driver. Third, it checks the availability of the communication port specified in the dialog box by users or by default. Fourth, it checks the security key on the interface board through the port of which the availability check is successful. Fifth, it initializes the port if the security key exists and is valid—otherwise, the driver shows a error message and aborts. Finally, when activated by the signal of a scanner, a reader, or a touch memory pen, the driver decodes and transmits the valid information to any Windows application.

Once the driver is loaded using the Windows Control Panel, it is installed into memory and executed automatically each time the Windows operating system starts.

While the invention has been particularly shown and described with reference to preferred embodiments thereof, it will be understood by those skilled in the art that various changes in form and details may be made therein without departing from the spirit and scope of the invention. For example, the invention could be adapted for use on a palm-top computer with routine modifications.

The embodiments of the invention in which an exclusive property or privilege is claimed are defined as follows:

1. A system for automatic identification of an item-to-be-identified, comprising:
    indicia on said item-to-be-identified, said indicia bearing information useful in identifying said item;
    reader means for reading said indicia and for outputting undecoded raw signals indicative of said information useful in identifying said item;
    interface means for permitting a personal computer to receive said raw signals directly through a communication port without first decoding said signals, said interface means being external to said personal computer;
    connector means connecting at one end to said communication port of said personal computer via said slave interface and connecting at the other end to said reader means;
    said personal computer further comprising:
        processor means for sampling and decoding said raw signals; and
        memory means for storing decoded signals.

2. A reader system capable of interfacing multiple reader devices to a personal computer using a single communication port, comprising:
    a personal computer comprising a communication port;
    a plurality of reader devices for reading indicia from a respective plurality of items-to-be-identified and for outputting undecoded raw signals indicative of said information useful in identifying said item;
    a slave interface means external to said personal computer for permitting said personal computer to receive raw reader signals directly through said communication port from said plurality of reader devices, said slave interface sending said raw reader signals to an input signal line of said communication port of said personal computer;
    connector means connecting at one end to said communication port of said personal computer via said slave interface and connecting at the other end to said plurality of reader means for receiving said raw reader signals from said plurality of reader devices;
    said personal computer further comprising:
        means for sampling said raw reader signals in response to receipt of an interrupt;
        means for decoding sampled reader signals; and
        means for using decoded reader signals to ascertain information regarding said items-to-be-identified.

3. The system according to claim 2, wherein said plurality of reader devices comprises first and second reader devices, said first reader device being capable of reading indicia of a first type and said second, different reader device being capable of reading indicia of a second type.

4. A method for automatically identifying items, comprising the steps of:
    using a reader device to read indicia from an item-to-be-identified, said indicia bearing information useful in identifying said item;
    outputting from said reader device undecoded raw signals indicative of said information useful in identifying said item;
    receiving said raw reader signals at a slave interface means which is external to a personal computer;
    using said slave interface means to transfer said raw signals to said personal computer directly via a communication port of said personal computer without first decoding said raw signals;
    connecting said communication port of said personal computer via said slave interface to said reader device; and
    using a processor means of said personal computer to sample and decode said raw reader signals, whereby a decoded identification signal is produced.

5. A method for interfacing multiple reader devices to a personal computer using a single communication port, comprising the steps of:
    reading indicia from a respective plurality of items-to-be-identified of a plurality of reader devices and outputting undecoded raw signals indicative of said information useful in identifying said item;
    permitting said personal computer to receive raw reader signals via an external slave interface directly through a communication port from said plurality of reader devices;
    sending said raw reader signals from said slave interface to an input signal line of said communication port of said personal computer;

connecting said communication port of said personal computer via said slave interface to said plurality of reader means for receiving said raw reader signals from said plurality of reader devices;

sampling in said personal computer said raw reader signals in response to receipt of an interrupt;

decoding said sampled reader signals in the personal computer; and using decoded reader signals to ascertain information regarding said items-to-be-identified.

\* \* \* \* \*